(12) United States Patent
Pickles et al.

(10) Patent No.: US 12,337,709 B2
(45) Date of Patent: Jun. 24, 2025

(54) SUPPLY STATION AND METHOD CAPABLE OF CHARGING ELECTRICITY AND FILLING WITH HYDROGEN GAS SIMULTANEOUSLY OR SEPARATELY

(71) Applicants: China Energy Investment Corporation Limited, Beijing (CN); National Institute of Clean-and-Low-Carbon Energy, Beijing (CN)

(72) Inventors: Jeff Pickles, Sunnyvale, CA (US); Anthony Ku, Fremont, CA (US); Xianming Jimmy Li, Orefield, PA (US); Surinder Singh, Fremont, CA (US); Jeff Allen, San Ramon, CA (US)

(73) Assignees: China Energy Investment Corporation Limited, Beijing (CN); National Institute of Clean-and-Low-Carbon Energy, Beijing (CN)

( * ) Notice: Subject to any disclaimer, the term of this patent is extended or adjusted under 35 U.S.C. 154(b) by 712 days.

(21) Appl. No.: 17/254,582

(22) PCT Filed: Jun. 20, 2019

(86) PCT No.: PCT/CN2019/092010
§ 371 (c)(1),
(2) Date: Dec. 21, 2020

(87) PCT Pub. No.: WO2020/062956
PCT Pub. Date: Apr. 2, 2020

(65) Prior Publication Data
US 2021/0261010 A1    Aug. 26, 2021

(30) Foreign Application Priority Data
Sep. 25, 2018   (CN) .......................... 201811115081.4

(51) Int. Cl.
*B60L 53/30*    (2019.01)
*B60L 50/75*    (2019.01)
(Continued)

(52) U.S. Cl.
CPC ............... *B60L 53/30* (2019.02); *B60L 50/75* (2019.02); *B60L 53/53* (2019.02); *B60L 53/54* (2019.02);
(Continued)

(58) Field of Classification Search
CPC .......... B60L 53/30; B60L 53/53; B60L 53/54; B60L 50/75; F17D 1/04; F17C 5/06;
(Continued)

(56) References Cited

U.S. PATENT DOCUMENTS 7,523,770 B2 *   4/2009   Horowitz ................ B60L 53/30
141/94
8,461,804 B1 *   6/2013   Capizzo .................. B60L 53/66
320/109

(Continued)

FOREIGN PATENT DOCUMENTS

CN   101728860 A   6/2010
CN   202026127 U   11/2011
(Continued)

OTHER PUBLICATIONS

Machine Translation of JP2014122399, Jul. 2014, all pages (Year: 2014).*

(Continued)

*Primary Examiner* — Nicolas A Arnett
(74) *Attorney, Agent, or Firm* — Conley Rose, P.C.; Brooks W Taylor

(57) ABSTRACT

A supply station and method are provided for charging an electric vehicle and filling a hydrogen-powered vehicle with hydrogen gas simultaneously or separately. The supply
(Continued)

station includes a power supply unit, a storage battery system, an electricity-hydrogen conversion device, a hydrogen gas storage system, a hydrogen-electricity conversion device, a charger, and a hydrogen dispenser. The power supply unit and the hydrogen-electricity conversion device supply power to the storage battery system. The power supply unit and the storage battery system power the electricity-hydrogen conversion device. The electricity-hydrogen conversion device stores hydrogen gas in the hydrogen gas storage system. The hydrogen gas storage system provides hydrogen gas to the hydrogen-electricity conversion device. The charger charges an electric vehicle with electric power from the storage battery system. The hydrogen dispenser fills hydrogen gas into a hydrogen-powered vehicle.

17 Claims, 1 Drawing Sheet

(51) Int. Cl.
  *B60L 53/53* (2019.01)
  *B60L 53/54* (2019.01)
  *F17D 1/04* (2006.01)
  *H02J 7/02* (2016.01)
  *F17C 5/06* (2006.01)

(52) U.S. Cl.
  CPC .............. *F17D 1/04* (2013.01); *H02J 7/02* (2013.01); *F17C 5/06* (2013.01); *F17C 2265/04* (2013.01); *F17C 2265/065* (2013.01); *F17C 2270/0139* (2013.01); *Y02E 60/32* (2013.01); *Y02E 60/36* (2013.01); *Y02E 70/30* (2013.01); *Y02T 90/12* (2013.01); *Y02T 90/40* (2013.01)

(58) Field of Classification Search
  CPC ............ F17C 2265/04; F17C 2265/065; F17C 2270/0139; H02J 7/02; Y02E 60/32; Y02E 60/36; Y02E 70/30; Y02E 90/12; Y02E 90/40
  See application file for complete search history.

(56) References Cited

U.S. PATENT DOCUMENTS

| | | | | |
|---|---|---|---|---|
| 9,873,408 | B2* | 1/2018 | Capizzo | B60L 53/66 |
| 11,641,128 | B2* | 5/2023 | Martin | B60L 53/35 |
| | | | | 320/101 |
| 2003/0008183 | A1* | 1/2003 | Hsu | F17C 11/005 |
| | | | | 422/198 |
| 2007/0144605 | A1* | 6/2007 | Horowitz | G06Q 50/30 |
| | | | | 141/83 |
| 2015/0328999 | A1* | 11/2015 | Dureau | B60L 50/51 |
| | | | | 320/109 |

FOREIGN PATENT DOCUMENTS

| | | | | |
|---|---|---|---|---|
| CN | 104354602 | A | 2/2015 | |
| CN | 104393626 | A | 3/2015 | |
| CN | 105946607 | A | 9/2016 | |
| CN | 107204476 | | 9/2017 | |
| CN | 107204476 | A | 9/2017 | |
| CN | 107327700 | A | 11/2017 | |
| CN | 207225130 | | 4/2018 | |
| CN | 207225130 | U | 4/2018 | |
| CN | 108460713 | | 8/2018 | |
| CN | 108460713 | A | 8/2018 | |
| JP | 2004355838 | | 12/2004 | |
| JP | 2008011614 | | 1/2008 | |
| JP | 2014122399 | A * | 7/2014 | ............... C25B 1/04 |
| JP | 2016044828 | | 4/2016 | |
| JP | 2016100934 | | 5/2016 | |
| JP | 2017119493 | A | 7/2017 | |
| WO | WO2011092579 | | 8/2011 | |

OTHER PUBLICATIONS

Japanese Office Action; Application No. 2020-568590; Apr. 11, 2022; 13 pages.
Japanese Notice of Reasons for Refusal (w/ English translation) for corresponding JP Application No. 2020568590, dated Sep. 9, 2021, 12 pages.
International Search Report (w/ English translation) PCT/CN2019/092010, mailed on Sep. 27, 2019, 4 pages.

* cited by examiner

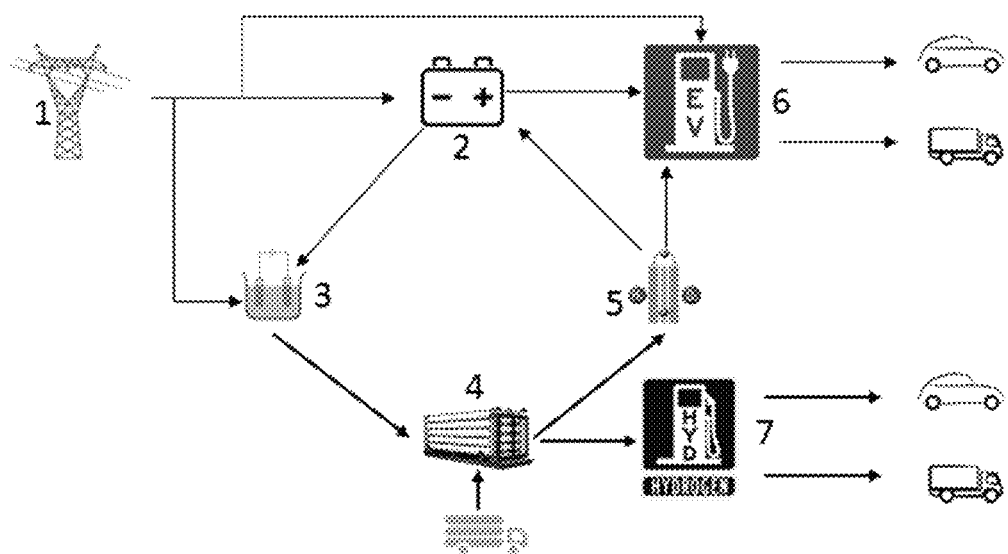

SUPPLY STATION AND METHOD CAPABLE OF CHARGING ELECTRICITY AND FILLING WITH HYDROGEN GAS SIMULTANEOUSLY OR SEPARATELY

CROSS-REFERENCE TO RELATED APPLICATIONS

The present application is a national phase application of PCT International Patent Application No. PCT/CN2019/092010, filed Jun. 20, 2019, which, in turn, is based upon and claims the right of priority to Chinese Patent Application No. 201811115081.4, filed Sep. 25, 2018, the disclosures of both of which are hereby incorporated by reference herein in their entirety for all purposes.

FIELD

The present disclosure relates to the technical field of supplying vehicles with energy, in particular to a supply station and a method capable of charging electricity and filling with hydrogen gas simultaneously or separately.

BACKGROUND

The zero emission vehicles, including electric vehicles and hydrogen-powered fuel cell vehicles, the two types of vehicles require rapid refueling on long distance inter-province or inter-state highway with low population density when the zero emission vehicles become widespread.

The infrastructure over ultra-long distance may adopt the solution of independent hydrogen refueling station or charging station, which will be very expensive, or adopt the solution consisting of more efficient and flexible supply stations to support the filling of several types of fuels. Hydrogen gas provides the zero emission advantages for medium/heavy duty vehicles, buses, and may ultimately occupy a significant share of passenger cars. The deployment of electric vehicles in zero emission vehicles is accelerating, but the electric vehicles require longer charging time, and there are limited opportunities to access high power chargers along the inter-province or inter-state highway.

If one of the technologies of electric vehicles and hydrogen-powered fuel cell vehicles dominates, the station devices should be disposed with similar capacities and connection methods (including floor space, etc.) to reconfigure the station. Furthermore, the electric vehicle charging solutions based on Direct Current (DC) quick chargers (an example under current development has an installed capacity near 350 KW) for minimizing charging time (30 minutes) would require a buffer battery system to relieve stress on the power grid (in terms of peak demand and expensive usage time costs). The power supply for Electric Vehicle (EV) chargers can come directly from the power grid or the locally distributed energy sources.

Currently, there is a need for long distance inter-province or inter-state highway refueling stations that meet energy and power density requirements, in particular, enough energy shall be stored to accommodate the long distance electric vehicles requiring high voltages and long distance hydrogen-powered vehicles (including trucks). The high voltage charging technology is useful, because the time required for charging an electric vehicle can be reduced, however, providing the power output required for high voltage demands a large battery storage system. The confronted challenge is the requirement of high power levels, which is solved by either using batteries with high energy density, or drawing large amounts of electrical energy from the power grid. The current systems only use battery storage, but the energy density limitation of batteries means that the very large (and expensive) systems are needed to accommodate the energy levels required to power high voltage systems. Affordability is a challenge when the installed capacity of said systems reaches the 100 megawatt-hours or a larger range.

The combined supply station has the potential to be reconfigurable, it can reduce the cost of individual stations by sharing facility costs, power grid connections and payment schemes.

U.S. Pat. No. 7,523,770B2 discloses a vehicle service station, comprising a plurality of fuel sources including different grades of liquid fuel, $H_2$ and electricity. The station is capable of accommodating different types of vehicles through different filling stations adapted for vehicles using each kind of fuel. It further describes a wireless communication system that is capable of communicating the requirements of a vehicle in order to guide the vehicle to the appropriate service block by using the correct filling technique. U.S. Pat. No. 7,523,770B2 merely defines that a plurality of fuels are stored, however, there is a risk that the storage of a fuel may be exhausted if the demand for a fuel is high.

US20030008183A1 discloses an energy supply station for converting a hydrocarbon fuel into at least one of hydrogen and electricity for subsequent delivery to a vehicle, the station comprising one or more chemical converters positioned to receive a fuel and process the fuel to form an output medium comprising carbon dioxide, a separation stage for separating chemical components from the output medium, a collection element in a fluid circuit having the separation stage for collecting the carbon dioxide, and a vehicle interface for interfacing with the vehicle. One feature of the energy supply station is the variable generation of electricity and hydrogen on site to meet fuel demand through a reformer or a fuel cell for example. US20030008183A1 describes the on-site conversion of hydrocarbon fuels to electricity and hydrogen, however, the chemical process required by such a conversion involves multiple unit operations, and its response time and power density are limited.

As can be seen from the foregoing content, neither the separate infrastructure solution nor the combined supply station can meet the demands of long-distance electric vehicles requiring high voltage and long-distance hydrogen-powered vehicles (including trucks), and cannot meet the continuously changing electric power and hydrogen demands.

SUMMARY

The present disclosure aims to overcome the problem that the existing energy supply station cannot meet the continuously changing electric power and hydrogen demands, and provides a supply station and a method capable of charging electricity and filling with hydrogen gas simultaneously or separately. The supply station and method capable of charging electricity and filling with hydrogen gas simultaneously or separately provided by the present disclosure can meet the continuously changing electric power and hydrogen demands, and may optimize the costs.

In order to fulfill the above purpose, a first aspect of the present disclosure provides a supply station capable of charging electricity and filling with hydrogen gas simultaneously or separately, the supply station comprising:

a power supply unit, a storage battery system, a device capable of converting electric power into hydrogen gas, a hydrogen gas storage system, a device capable of converting hydrogen gas into electric power, a charger and a hydrogen dispenser;

wherein the power supply unit is connected with the storage battery system to deliver power; the storage battery system is connected with the device capable of converting electric power into hydrogen gas so as to convert the electric power provided by the storage battery system into hydrogen gas; the device capable of converting electric power into hydrogen gas is connected with the hydrogen gas storage system to store hydrogen gas in the hydrogen gas storage system; the hydrogen gas storage system is connected with the device capable of converting hydrogen gas into electric power so as to convert hydrogen gas provided by the hydrogen gas storage system into electric power; the charger is connected with the storage battery system for charging an electric vehicle with electricity; the hydrogen dispenser is connected with the hydrogen gas storage system for filling hydrogen gas into a hydrogen-powered vehicle.

A second aspect of the present disclosure provides a method capable of charging electricity and filling with hydrogen gas simultaneously or separately, the method comprising:

charging an electric vehicle with electricity by using a storage battery system, and filling hydrogen gas into a hydrogen-powered vehicle by using a hydrogen gas storage system;

adopting a device capable of converting electric power into hydrogen gas and a device capable of converting hydrogen gas into electric power to perform the conversion between hydrogen gas and electric power, so as to implement distribution of charging electricity and filling with hydrogen gas.

Compared with the prior art, the supply station and the method capable of charging electricity and filling with hydrogen gas simultaneously or separately provided by the present disclosure have the following advantages:

(1) the supply station provided by the present disclosure has the capability of dynamically adjusting the ratio of available hydrogen gas to electric power;

(2) the supply station provided by the present disclosure can store energy in an electric or chemical form, meet fuel requirements and optimize capital cost;

(3) the supply station provided by the present disclosure has the capability of providing high-voltage charging electricity at a higher rate than the power grid connection;

(4) the present disclosure employs a reconfigurable distribution techniques to deliver electric power and hydrogen gas under a variety of conditions, thereby maintain flexibility and compatibility with continuously changing fuel standards.

BRIEF DESCRIPTION OF THE DRAWINGS

FIG. 1 is a schematic diagram of a supply station capable of charging electricity and filling with hydrogen gas simultaneously or separately provided by the present disclosure.

DESCRIPTION OF THE REFERENCE SIGNS

1. Power supply unit
2. Storage battery system
3. Device capable of converting electric power into hydrogen gas
4. Hydrogen gas storage system
5. Device capable of converting hydrogen gas into electric power
6. Charger
7. Hydrogen dispenser

DETAILED DESCRPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

As shown in FIG. 1, a first aspect of the present disclosure provides a supply station capable of charging electricity and filling with hydrogen gas simultaneously or separately, the supply station comprising:

a power supply unit 1, a storage battery system 2, a device capable of converting electric power into hydrogen gas 3, a hydrogen gas storage system 4, a device capable of converting hydrogen into electric power 5, a charger 6 and a hydrogen dispenser 7;

wherein the power supply unit 1 is connected with the storage battery system 2 to deliver power; the storage battery system 2 is connected with the device capable of converting electric power into hydrogen gas 3, so as to convert the electric power supplied by the storage battery system 2 into hydrogen gas;

the device capable of converting electric power into hydrogen 3 is connected with the hydrogen gas storage system 4 to store hydrogen gas in the hydrogen gas storage system 4; the hydrogen gas storage system 4 is connected with the device capable of converting hydrogen gas into electric power 5 so as to convert hydrogen gas provided by the hydrogen gas storage system 4 into electric power; the charger 6 is connected with the storage battery system 2 for charging an electric vehicle with electricity; the hydrogen dispenser 7 is connected with the hydrogen gas storage system 4 for filling hydrogen gas into the hydrogen-powered vehicle.

The storage battery system 2 and the hydrogen gas storage system 4 are storage units of electric power and hydrogen gas, respectively; the device capable of converting electric power into hydrogen gas 3 and the device capable of converting hydrogen gas into electric power 5 are units for mutual conversion between hydrogen gas and electric power; the charger 6 and the hydrogen dispenser 7 deliver electric power and hydrogen gas to the electric vehicle and the hydrogen-powered vehicle, respectively.

According to an embodiment of the present disclosure, when the power supplied by the power supply unit 1 and/or the storage battery system 2 does not completely match the electric vehicle, for example, the voltage or current is excessively low or excessively high, the charger 6 may be used to convert the electric power to be suitable for the electric vehicle.

According to an embodiment of the present disclosure, when the hydrogen gas provided by the hydrogen gas storage system 4 does not completely match the hydrogen-powered vehicle, such as the flow rate or pressure is excessively high or excessively low, the hydrogen gas may be processed by the hydrogen dispenser 7 to be suitable for the hydrogen-powered vehicle.

The present disclosure does not impose a specific limitation to the electric vehicle and the hydrogen-powered vehicle, the electric vehicle may be various electricity-powered vehicle conventionally used in the technical field, and the hydrogen-powered vehicle may be various hydrogen-powered vehicle conventionally used in the technical field.

According to a preferred embodiment of the present disclosure, the power supply unit 1 is connected with the device capable of converting electric power into hydrogen gas 3 so as to supply the electric power required by the device capable of converting electric power into hydrogen gas 3. The power supplied by the power supply unit 1 is applied to the device capable of converting power into hydrogen gas 3 so as to convert the electric power into hydrogen gas. With this preferred embodiment, when the demand of hydrogen gas is large, the device capable of converting electric power into hydrogen gas 3 can be used to convert electric power supplied by the power supply unit 1 into hydrogen gas for filling the hydrogen-powered vehicle with hydrogen gas, and when the demand of hydrogen gas is small, the converted hydrogen gas can be stored in the hydrogen gas storage system 4.

According to a preferred embodiment of the present disclosure, the power supply unit 1 is connected with the charger 6 to charge the electric vehicle. By means of the preferred embodiment, the power supply unit 1 directly charges the electric vehicle with electricity through the charger 6. The electric power source of the electric vehicle may be the storage battery system 2 or the power supply unit 1.

According to a preferred embodiment of the present disclosure, the device capable of converting hydrogen gas into electric power 5 is connected with the storage battery system 2 and/or the charger 6 to charge the electric vehicle with electricity. The device capable of converting hydrogen gas into electric power 5 may be connected with either the storage battery system 2 or the charger 6, or connected with both the storage battery system 2 and the charger 6. The device capable of converting hydrogen gas into electrical power 5 converts hydrogen gas stored in the hydrogen gas storage system 4 into electrical power, which is delivered to the storage battery system 2 and/or the charger 6 for charging the electric vehicle with electricity. By means of the preferred embodiment, the electric power source of the electric vehicle during the peak charging period of the electric vehicle may be the electric power converted by the storage battery system 2, the power supply unit 1, and the device capable of converting hydrogen gas into electric power 5, so as to meet the requirements of long-distance electric vehicles requiring high voltage and short charging time. Due to such a preferred embodiment, the energy supply requirements for the storage battery system and the power supply unit are reduced; in addition, the occupied area and the investment cost are smaller than those of independent electric vehicle supply stations.

According to a preferred embodiment of the present disclosure, the power supply unit 1 is a power grid. The voltage level of the power grid is not particularly limited in the present disclosure, it may be appropriately selected according to the load of the supply station and the traffic flow rate. Preferably, the voltage of the power grid is within a range of 240-800V.

The supply station provided according to the present disclosure does not impose a specific limitation to the device capable of converting electric power into hydrogen gas 3, which may be various device capable of converting electric power into hydrogen gas conventionally used in the technical field, for example, the device capable of converting electric power into hydrogen gas 3 is an electrolyzer and/or a reversible fuel cell, and specifically, the electrolyzer may be at least one selected from the group consisting of an alkaline electrolyzer, a proton exchange membrane electrolyzer, a solid oxide electrolyzer and a reversible electrolyzer. Both the electrolyzer and reversible fuel cell are commercially available.

The supply station provided according to the present disclosure does not impose specific limitation to the device capable of converting hydrogen gas into electric power 5, which may be various device capable of converting hydrogen gas into electric power conventionally used in the technical field, for example, the device capable of converting hydrogen gas into electric power 5 is a fuel cell and/or a reversible type electrolyzer, and specifically, the fuel cell is at least one selected from the group consisting of a proton exchange membrane fuel cell, a solid oxide fuel cell and a reversible type fuel cell. Both the fuel cell and the reversible electrolyzer are commercially available.

The supply station provided by the present disclosure is capable of performing reconfiguration, and has the ability to dynamically adjust the ratio of available hydrogen gas to electric power, so as to dynamically respond to vehicle demand. The supply station provided by the present disclosure is capable of storing energy in electrical or chemical form, meeting fuel demand, and optimizing capital costs by sharing the costs of electric power and hydrogen gas stations. The supply station provided by the present disclosure can directly store the electric power from the power grid, and can also be used for generating hydrogen gas for storage, such that the supply station can store energy during a non-peak period, thereby further improve stability of the power grid connected with the wind power station or solar power plant. The supply station provided by the present disclosure can convert hydrogen gas into electric power for use, and has the capability of providing high-voltage charging at a higher rate than that of a connection with power grid. In addition, another advantage of the present disclosure is the reconfigurability, the supply station is compatible with new fuel dispensing requirements, the interchangeability of the energy supply means that the station is not subject to limitations of the energy supply when it is retrofitted with new dispensing device.

A second aspect of the present disclosure provides a method capable of charging electricity and filling with hydrogen gas simultaneously or separately, the method comprising:

charging an electric vehicle with electricity by using a storage battery system 2, and filling hydrogen gas into a hydrogen-powered vehicle by using a hydrogen gas storage system 4;

adopting a device capable of converting electric power into hydrogen gas 3 and a device capable of converting hydrogen gas into electric power 5 to perform the conversion between hydrogen gas and electric power, so as to implement distribution of charging electricity and filling with hydrogen gas.

According to the method provided by the present disclosure, the electric power supplied by the storage battery system 2 and the hydrogen gas supplied by the hydrogen gas storage system 4 may subject to conversion of the device capable of converting electric power into hydrogen gas 3 and the device capable of converting hydrogen gas into electric power 5, so as to perform distribution of charging electricity and filling with hydrogen gas. Specifically, when the hydrogen gas demand is large, the device capable of converting electric power into the hydrogen gas 3 can be used for converting the electric power provided by the storage battery system 2 into the hydrogen gas to fill the hydrogen-powered vehicle with hydrogen gas, so as to alleviate the risk of energy exhaustion of the hydrogen gas storage system 4, and lower the requirement on the hydrogen storage capacity of the hydrogen gas storage system 4 during a peak period; when the demand for electric power is large, the device capable of converting hydrogen gas into electric power 5 can be utilized to convert the hydrogen gas provided by the hydrogen gas storage system 4 into electric power to charge the electric vehicle with electricity, so that the energy supply requirement on the storage battery system 2 can be reduced, and the supply station has smaller floor area and investment cost than an independent electric vehicle supply station.

According to a preferred embodiment of the present disclosure, the method further comprises: charging the storage battery system 2 and/or the electric vehicle by using power grid. It is further preferred that the hydrogen gas in the hydrogen gas storage system 4 is converted into electric power by the device capable of converting hydrogen gas into electric power 5 for delivery to the storage battery system 2 and/or the electric vehicles when the output power of the power grid and storage battery system 2 cannot meet the demand for electricity by the electric vehicles. Due to such a preferred embodiment, the energy requirements of the method provided by the present disclosure for the storage battery system 2 and the power grid are reduced, and the method provided by the present disclosure can use a storage battery system 2 having a smaller floor area than the method of independently providing electric vehicle with electric power.

The voltage of the power grid is as previously mentioned, and will not repeated here.

According to the method provided by the present disclosure, preferably, when the output hydrogen gas cannot meet the demand of the hydrogen-powered vehicles for hydrogen gas, the electric power provided by the storage battery system 2 and/or the power grid is converted into hydrogen gas by the device capable of converting electric power into hydrogen gas 3 for being filled into the hydrogen-powered vehicles. The hydrogen in the hydrogen gas storage system 4 is at a risk of being exhausted during a peak period of filling hydrogen gas into the hydrogen-powered vehicles, the method provided by the present disclosure can adopt the device capable of converting electric power into hydrogen gas 3 to convert the electric power provided by the storage battery system 2 and/or the power grid into hydrogen gas, thereby alleviate the risk of exhausted hydrogen gas. In addition, the preferred embodiment lowers the requirement on the hydrogen storage capacity of the hydrogen gas storage system 4 and reduces the device investment.

According to a preferred embodiment of the present disclosure, the storage battery system 2 is charged with electricity by using the power grid when it is not necessary to use the power grid for charging the electric vehicles with electricity. It is further preferred that the storage battery system 2 is charged with electricity by using the power grid when it is not required to charge the electric vehicles with electricity (i.e. neither the power grid nor the storage battery system 2 is required for charging the electric vehicles with electricity). The power grid is used during a non-peak period of the electric vehicles for charging the storage battery system 2 with electricity to supplement the power consumed by the storage battery system 2, thereby further improve stability of the power grid connected with the wind power station or solar power plant.

According to a preferred embodiment of the present disclosure, the method provided by the present disclosure further comprises replenishing the hydrogen gas storage system 4 with consumed hydrogen gas by using an external hydrogen source (e.g., a pipe trailer).

According to a preferred embodiment of the present disclosure, when the hydrogen gas storage system 4 is capable of meeting the hydrogen gas demand of the hydrogen-powered vehicles, the device capable of converting electric power into hydrogen gas 3 is used to convert electric power provided by the power grid into hydrogen gas for storage in the hydrogen gas storage system 4. By using such a preferred embodiment, the power grid is used for replenishing the hydrogen gas storage system 4 with consumed hydrogen gas via the device capable of converting electric power into hydrogen gas 3 during the non-peak periods of hydrogen gas. Such a preferred embodiment is more advantageous for improving stability of the power grid connected with the wind power station or solar power plant.

According to the method provided by the present disclosure, the selection of the device capable of converting electric power into hydrogen gas 3 and the device capable of converting hydrogen gas into electric power 5 is as previously mentioned, and will not repeated here.

According to a specific embodiment of the present disclosure, the method further comprises: converting electric power to an applicable specification of the electric vehicle prior to delivery of the electric power to the electric vehicle; and converting hydrogen gas into the applicable specification of the hydrogen-powered vehicle prior to delivery of hydrogen gas to the hydrogen-powered vehicle. The electric power provided by the power grid and/or the storage battery system 2 may not be completely matched with the electric vehicle (e.g., the voltage or current is excessively low or excessively high), the electric power may be converted into an applicable specification for the electric vehicle, and the charger 6 may be used for conversion of electric power. When the hydrogen gas provided by the hydrogen gas storage system 4 is not completely matched with the hydrogen-powered vehicle (e.g., the flow rate or pressure is excessively high or excessively low), the hydrogen gas can be converted into an applicable specification for the hydrogen-powered vehicle, and the hydrogen dispenser 7 may be used for processing the hydrogen gas.

The present disclosure will be described in detail below with reference to specific examples.

The vehicles serviced by the supply station include electric vehicles (including trucks and cars) and hydrogen-powered vehicles (including trucks and cars).

The electric power requirement for charging electricity is associated with the following factors: (1) the number of electric vehicles simultaneously serviced by the supply station; (2) the charge capacity of the electric vehicle battery; (3) the target charging time of the electric vehicle. For example, 5.2MW of electric power is required to charge an electric truck with a battery capacity of 2,600 kWh within 30 minutes; 1.2MW of electric power is required to charge an electric vehicle with a battery capacity of 100 kWh within 5 minutes. In an electric vehicle charging station, the electric power is provided by a combination of electric power derived from the power grid and electric power provided by on-site battery storage, the on-site battery storage will be charged with electricity during the off-peak period of charging demand.

The requirement of filling hydrogen gas is related to the following factors: (1) the number of hydrogen-powered vehicles simultaneously serviced by the supply station; (2) hydrogen gas storage tank capacity of a hydrogen-powered vehicle; (3) the target time of filling hydrogen gas for a hydrogen-powered vehicle. For instance, a hydrogen-powered truck having a hydrogen gas storage tank capacity of 100 kg and a hydrogen filling time of 30 minutes requires a hydrogen gas loading capacity of 200 kg/hour. A hydrogen-powered car having a hydrogen gas storage tank capacity of 5 kg and a hydrogen filling time of 5 minutes requires a hydrogen gas loading capacity of 60 kg/hour. In a hydrogen refueling station, the hydrogen gas is stored on-site, and the hydrogen gas storage system is periodically replenished with an external source of hydrogen gas (e.g., by a pipe trailer).

The electric power and hydrogen gas delivery requirements of the separately provided charging station will be determined by the vehicle requirements described above.

The combined supply station provided by the present disclosure has the advantages that the peak power load of the power grid can be reduced in the combined supply station by providing the supplementary electric power through the arrangement of the device (such as a fuel cell) capable of converting hydrogen gas into electric power; likewise, the provision of a device (e.g., an electrolyzer) capable of converting electric power into hydrogen gas may partially meet the demand for hydrogen gas, reducing the demand in regard to the on-site hydrogen gas storage device in the combined supply station, the electric power for the device capable of converting electric power into hydrogen gas is provided by the power grid or the on-site storage battery system. Each of the requirements on the peak power load of power grid, on-site storage battery capacity, delivery rate of hydrogen gas and on-site hydrogen gas storage capacity is reduced relative to an independent single (EV or $H_2$) fueling station.

Table 1 below lists the calculated data for a combined supply station provided by the present disclosure and individual EV charging station.

TABLE 1

|  | Electric truck | Electric car |
|---|---|---|
| Number of simultaneously charged vehicles | 4 | 10 |
| Battery capacity, kWh | 2,600 | 100 |
| Required charging time, min | 30 | 5 |
| Required power capacity, MW | 20.8 | 12 |
| The electric power provided by the power grid, MW | 10 | |

As illustrated in Table 1, if a single EV charging station is used, it requires a peak power consumption of 32.8 MW, when the power grid having an installed capacity of 10MW power is connected as the power source, the on-site storage battery system of the EV charging station requires a 30 minute time interval to reach the storage capacity 22.8 MWh. The combined supply station provided by the present disclosure is connected with the power grid having an installed capacity of 10MW power, the rest capacity 22.8 MW is provided by a combination of the fuel cell and the on-site storage battery system, when the fuel cell shares 50% of the cell storage capacity, the storage capacity 11.4MW is provided by the fuel cell, and the on-site storage battery system of the supply station only needs 30 minutes to reach the storage capacity of 11.4 MWh. The supply station provided by the present disclosure can reduce the energy storage requirement of the storage battery system from 22.8 MWh to 11.4 MWh.

In this example, when the vehicles served by the supply station are continuously arrived (i.e., 4 electric trucks and 10 electric cars are required for charging electricity for every 30 minutes), it is required to directly replenish the storage battery system with electric power by using the fuel cells. While the vehicles served by the supply station intermittently arrive, the storage battery system may be charged with electricity by using the power grid and/or fuel cell during the off-peak period.

When the storage battery system has operated for 30 minutes, the system is then charged with electricity during a 30 minute shutdown period, the storage battery system requires 11.4 MWh of storage capacity during the 30 minute shutdown period, and the storage battery system requires 22.8 MW (11.4 MWh/0.5 h) of power capacity to charge electricity to the full capacity. If the power grid provides an installed capacity of 10MW, the power requirement of fuel cell capacity is 12.8 MW.

When the storage battery system has operated for 30 minutes, the system is then charged with electricity during a 60 minute shutdown period, the storage battery system requires 11.4 MWh of storage capacity during the 60 minute shutdown period, and the storage battery system requires 11.4 MW (11.4 MWh/1 h) of power capacity to charge electricity to the full capacity. If the power grid provides an installed capacity of 10 MW, the power requirement of the fuel cell is only 1.4 MW.

The electric power of the fuel cell may be designed according to the traffic volume of vehicles serviced by a particular supply station.

Table 2 below lists the calculated data for the combined supply station and the individual hydrogen refueling station provided by the present disclosure.

TABLE 2

|  | Hydrogen-powered truck | Hydrogen-powered car |
|---|---|---|
| Number of vehicles filling with hydrogen gas simultaneously | 4 | 4 |
| Hydrogen gas storage tank capacity, kg | 100 | 5 |
| Required time of filling with hydrogen gas, min | 30 | 5 |
| Peak demand of hydrogen gas, kg/h | 800 | 240 |

As shown in Table 2, if an individual hydrogen refueling station is used, it requires a maximum load of 1,040 kg/h, and if the period of filling with hydrogen is 30 minutes, it requires a storage capacity of 420 kg (100×4+5×4) to meet the requirements.

If the power grid can supply an electrolysis device (e.g., an electrolyzer) with electric power, the connection with a power grid having an installed capacity of 10MW can produce 200 kg/hr (50 kWh/kg $H_2$) of hydrogen gas. This means that the power grid can replenish about half of the required hydrogen gas. The use of electrolyzer powered by the power grid can reduce the required on-site storage tank size or transmission frequency, depending on the hydrogenation cycle per day and the corresponding time arrangement. For example, an electrolyzer may provide 200 kg/hr of hydrogen gas (if the electrolyzer is running during both the hydrogenation period and the shutdown period) over a 30 minute hydrogenation period and a 30 minute shutdown period (a total of 24 hydrogenation periods over the 24 hour per day). This means that the net hourly consumption of hydrogen gas is 220 (420-200) kg/h. This is slightly more than half of the hydrogen exhaustion rate of the independent hydrogen refueling station. In this circumstance, the tank size required for the independent hydrogen refueling station during the period of 24 hour is 10,080 kg (24 hours×420 kg/hour), but the tank size required for the combined supply station is merely 5,280 kg (24 hours×220 kg/hour).

Compared with the supply station and the method provided by the prior art, the supply station and the method provided by the present disclosure can perform dynamic adjustments according to the requirements of the electric vehicles and hydrogen-powered vehicles, and reduce device investment and relieve the limitation of the electricity storage amount of the storage battery system and the hydrogen storage amount of the hydrogen gas storage system in the application process.

The above content describes in detail the preferred embodiments of the present disclosure, but the present disclosure is not limited thereto. A variety of simple modifications can be made to the technical solutions of the present disclosure within the scope of the technical concept of the present disclosure, including a combination of individual technical features in any other suitable manner, such simple modifications and combinations thereof shall also be regarded as the content disclosed by the present disclosure, each of them falls into the protection scope of the present disclosure.

The invention claimed is:

1. A supply station capable of charging electricity and filling with hydrogen gas simultaneously or separately, the supply station comprising:
a power supply unit for supplying electric power, a storage battery system, an electricity-hydrogen conversion device capable of converting electric power into hydrogen gas, a hydrogen gas storage system, a hydrogen-electricity conversion device capable of converting hydrogen gas into electric power, a charger, and a hydrogen dispenser, wherein the power supply unit is a power grid that supplies electric power to the storage battery system and to the charger;
the storage battery system is configured to store the electric power supplied respectively by the power supply unit and the hydrogen-electricity conversion device;
the electricity-hydrogen conversion device is configured to convert the electric power supplied by the power supply unit into hydrogen gas;
the hydrogen gas storage system is configured to store the hydrogen gas generated by the electricity-hydrogen conversion device;
the hydrogen-electricity conversion device is configured to convert the hydrogen gas provided by the hydrogen gas storage system into electric power;
the charger is configured to:
charge an electric vehicle with the electric power supplied by the storage battery system and the power supply unit, and
the hydrogen dispenser is configured to fill hydrogen gas supplied by the hydrogen gas storage system into a hydrogen-powered vehicle; and
wherein the storage battery system is charged with electric power supplied by the power supply unit when it is not necessary to charge the electric vehicle with electric power supplied by the power supply unit.

2. The supply station according to claim 1, wherein the storage battery system is configured to supply electric power to the electricity-hydrogen conversion device.

3. The supply station according to claim 1, wherein the electricity-hydrogen conversion device is an electrolyzer and/or a reversible fuel cell.

4. The supply station according to claim 3, wherein the electrolyzer is at least one selected from the group consisting of an alkaline electrolyzer, a proton exchange membrane electrolyzer, a solid oxide electrolyzer and a reversible electrolyzer.

5. The supply station according to claim 1, wherein the hydrogen-electricity conversion device is a fuel cell and/or a reversible electrolysis cell.

6. The supply station according to claim 5, wherein the fuel cell is at least one selected from the group consisting of a proton exchange membrane fuel cell, a solid oxide fuel cell and a reversible type fuel cell.

7. A method of charging electricity and filling with hydrogen gas simultaneously or separately by use of the supply station according to claim 1, the method comprising:
charging an electric vehicle with electricity by using a storage battery system, and filling hydrogen gas into a hydrogen-powered vehicle by using a hydrogen gas storage system; and
adopting an electricity-hydrogen conversion device capable of converting electric power into hydrogen gas and a hydrogen-electricity conversion device capable of converting hydrogen gas into electric power to perform the conversion between hydrogen gas and electric power, so as to adjust distribution of charging electricity and filling with hydrogen gas.

8. The method according to claim 7, wherein the method further comprises: charging the storage battery system and/or the electric vehicle by using a power grid.

9. The method according to claim 8, wherein the hydrogen gas in the hydrogen gas storage system is converted into electric power by the hydrogen-electricity conversion device for delivery to the storage battery system and/or the electric vehicle when an output power of the power grid and the storage battery system cannot meet a demand of the electric vehicle for electric power.

10. The method according to claim 7, wherein the electric power provided by the storage battery system and/or the power grid is converted into hydrogen gas by the electricity-hydrogen conversion device for being filled into the hydrogen-powered vehicle, when hydrogen gas from the hydrogen gas storage system cannot meet a demand of the hydrogen-powered vehicle for hydrogen gas.

11. The method according to claim 7, wherein the storage battery system is charged with electric power by using the power grid when it is not necessary to use the power grid for charging the electric vehicle; and
when the hydrogen gas storage system is capable of meeting a hydrogen gas demand of the hydrogen-powered vehicle, the electricity-hydrogen conversion device is used to convert electric power provided by the power grid into hydrogen gas for storage in the hydrogen gas storage system.

12. The method according to claim 7, wherein the electricity-hydrogen conversion device is an electrolyzer and/or a reversible fuel cell.

13. The method according to claim 12, wherein the electrolyzer is at least one selected from the group consisting of an alkaline electrolyzer, a proton exchange membrane electrolyzer, a solid oxide electrolyzer and a reversible electrolyzer.

14. The method according to claim 7, wherein the hydrogen-electricity conversion device is a fuel cell and/or a reversible electrolysis cell.

15. The method according to claim 14, wherein the fuel cell is at least one selected from the group consisting of a proton exchange membrane fuel cell, a solid oxide fuel cell and a reversible type fuel cell.

16. The method according to claim 7, wherein the method further comprises:
   converting electric power to an applicable specification of the electric vehicle prior to delivery of the electric power to the electric vehicle; and
converting hydrogen gas into the applicable specification of the hydrogen-powered vehicle prior to delivery of hydrogen gas to the hydrogen-powered vehicle.

17. The supply station according to claim 1, wherein the storage battery system is charged with electric power supplied by the power supply unit when it is not required to charge the electric vehicle with electric power supplied by either the power grid or the storage battery system.

* * * * *